No. 842,220. PATENTED JAN. 29, 1907.
D. W. MARTIN.
GRIP HOOK FOR LOG LOADERS.
APPLICATION FILED OCT. 15, 1906.
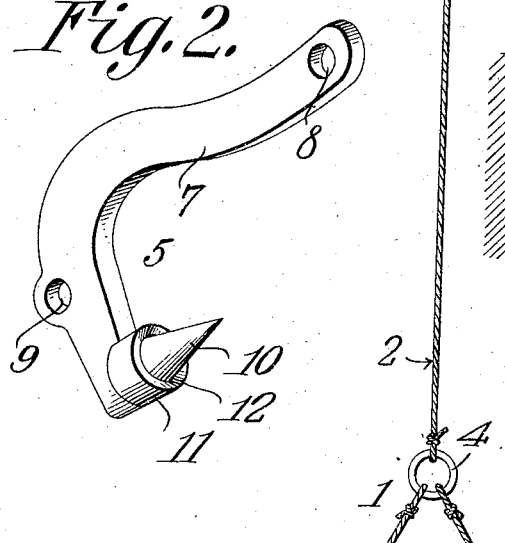
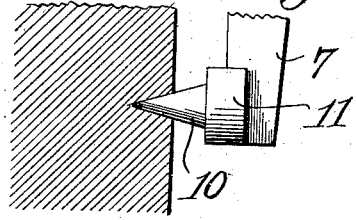
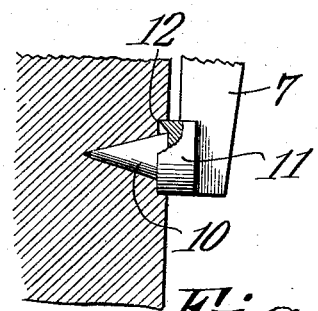
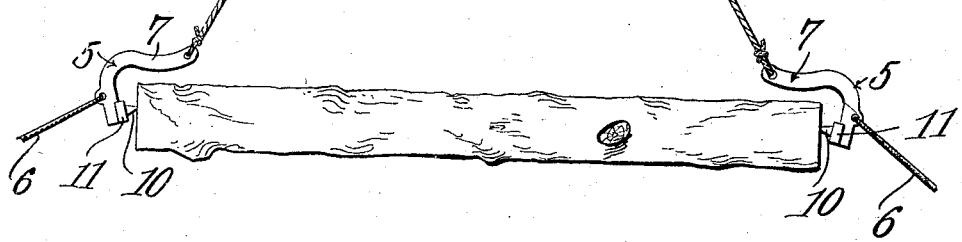
WITNESSES: Daniel W. Martin, INVENTOR.
By C. A. Snow & Co.
ATTORNEYS

UNITED STATES PATENT OFFICE.

DANIEL W. MARTIN, OF BROADDUS, TEXAS.

GRIP-HOOK FOR LOG-LOADERS.

No. 842,220.      Specification of Letters Patent.      Patented Jan. 29, 1907.

Application filed October 15, 1906. Serial No. 339,019.

*To all whom it may concern:*

Be it known that I, DANIEL W. MARTIN, a citizen of the United States, residing at Broaddus, in the county of San Augustine and State of Texas, have invented a new and useful Grip-Hook for Log-Loaders, of which the following is a specification.

This invention relates to gripping-hooks intended for use in connection with log-loading devices of that type having a crotched line to which the hooks are applied, whereby logs can be picked up by the hooks gripping their ends and moved from place to place—as, for instance, loading log-cars.

The invention has for one of its objects to provide a grip-hook which is of simple and inexpensive construction, safe and reliable in operation, and adapted to enable logs to be moved easily and with great despatch.

A further object of the invention is to construct a hook with a main biting means which operates alone or together with an auxiliary biting means to grip a log according to the weight thereof, so that slipping or dropping of the log will be effectively prevented.

Another object of the invention is the provision of a hook of the character referred to which is easily released from the log gripped thereby by slacking the line of the log-loading machine.

With these objects in view and others, as will appear as the nature of the invention is better understood, the invention comprises the varous novel features of construction and arrangement of parts, which will be more fully described hereinafter and set forth with particularity in the claims appended hereto.

In the accompanying drawings, which illustrate one of the embodiments of the invention, Figure 1 is a front elevation of the crotched end of the draft-line of the log-loader equipped with the gripping-hooks, which latter are shown gripping a log. Fig. 2 is a perspective view of one of the hooks. Fig. 3 is a detail view showing the manner in which the hooks grip a light log. Fig. 4 is a similar view showing the manner in which the hooks grip a comparatively heavy log.

Corresponding parts in the several figures are indicated throughout by similar characters of reference.

Referring to the drawings, 1 designates the draft device, which is commonly termed a "crotch-line," the same comprising a draft-line 2 and branches 3, connected with the line 2 in any suitable manner, as by means of a ring 4. The lines of the draft device may be a hemp rope, a wire cable, or a chain. The line 2 is of suitable length and is adapted to be wound around the drum of the log-loader, as will be readily understood.

On each of the free ends of the line 3 is a gripping-hook 5. The hooks are adapted to grip the opposite ends of a log to be lifted and transported, and the weight of the log serves to cause the hooks to bite firmly into the log. Each hook is provided with a hand-line 6, whereby the logs gripped by the hooks can be readily swung to the proper point of deposit. Each hook comprises a shank 7, made of flat metal curved into proper form and provided with an aperture 8 at one end for receiving the branch of the crotch-line and an eye or aperture 9 for receiving the hand-line 6. At the end of the shank opposite from the eye 8 is a conical-shaped spur or tooth 10, which extends at right angles from the adjacent portion of the shank. The shank is shaped somewhat after the form of the letter L. At the root of the spur 10 is a circular base portion 11, which is of larger diameter than the root of the spur, and the same is provided with an undercut edge 12, as shown more clearly in Fig. 4. This edge is annular and is preferably sharp.

In operation the two hooks 5 are applied to the ends of a log to be lifted, and while they are held with the points of the spurs to the log the signal is given for the operator controlling the loader to start the machine. The draft on the crotch-line tends to draw the two hooks toward each other, thereby causing the spurs to bite into the ends of the log. The spurs sink in a varying depth, according to the weight of the log being lifted. When a comparatively light log is lifted, the spurs sink into the same only partially, as shown in Fig. 3; but when a heavy log is lifted the spurs will bury into the same to their full extent, thereby causing the annular knife-edge 12 to also grip the log, as shown in Fig. 4. By this means the log will be positively prevented from tearing loose. As the draft-line continues to move the log is raised to the desired height and swung to the place of deposit. As the slack is produced in the draft-line the weight of the hooks 5 and of the lines 3 will operate to cause the hooks to automatically disengage from the log. Obviously this disengagement can be assisted by the hand-lines 6.

I have described the principle of operation of the invention, together with the apparatus which I now consider to be the best embodiment thereof; but I desire to have it understood that the apparatus shown is merely illustrative, and that various changes may be made, when desired, as are within the scope of the invention.

What is claimed is—

1. In a device of the class described, a crotched draft-line, and hooks attached to the line, each hook comprising a shank, a spur, and means at the root of the spur for forming an auxiliary means for gripping a log.

2. In a device of the class described, a gripping-hook provided with a spur forming the main gripping means, and a device associated with the spur forming the auxiliary gripping means.

3. In a device of the class described, a gripping-hook comprising an L-shaped structure, a spur disposed at right angles to one portion of the structure, and a biting means on the structure at the base of the spur and independent of the latter.

4. In a device of the class described, a gripping-hook comprising an L-shaped structure having an aperture at one end for receiving a draft-line and an aperture adjacent the other end for receiving a hand-line, a spur adjacent the last-mentioned end, and a biting edge on the structure associated with the spur and arranged to engage in an object after the spur.

5. In a device of the class described, a gripping-hook comprising a suitably-shaped structure, a spur thereon, and an annular biting edge around the base of the spur.

6. In a device of the class described, a gripping-hook comprising a suitably-shaped structure, and separate gripping means arranged adjacent each other and adapted to bite in a successive order.

In testimony that I claim the foregoing as my own I have hereto affixed my signature in the presence of two witnesses.

DANIEL W. MARTIN.

Witnesses:
W. T. WOOD,
W. H. WARE.